US012704236B2

(12) United States Patent
Duhme et al.

(10) Patent No.: US 12,704,236 B2
(45) Date of Patent: Aug. 11, 2026

(54) LIGHTING DEVICE FOR A MOTOR VEHICLE

(71) Applicant: Hella GmbH & Co. KGaA, Lippstadt (DE)

(72) Inventors: David Duhme, Lippetal (DE); Franz-Georg Willeke, Anröchte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/217,518

(22) Filed: May 23, 2025

(65) Prior Publication Data

US 2025/0369587 A1 Dec. 4, 2025

(30) Foreign Application Priority Data

Jun. 3, 2024 (DE) ......................... 102024115323.7

(51) Int. Cl.
*F21S 43/00* (2018.01)

(52) U.S. Cl.
CPC .................................. *F21S 43/601* (2024.05)

(58) Field of Classification Search
CPC .......... F21S 43/601; F21S 43/00; F21S 43/19; F21S 43/195; F21S 43/20; F21S 43/255; F21S 43/26; F21S 43/27; F21S 43/30; F21S 43/31; F21S 43/37; F21S 43/51
See application file for complete search history.

(56) References Cited

U.S. PATENT DOCUMENTS

2017/0343856 A1* 11/2017 Grandclerc ............ G03B 21/30
2019/0257493 A1* 8/2019 Sugiyama ............ F21S 41/141
2023/0135025 A1* 5/2023 Muegge ............ G02F 1/133613 362/520
2024/0302017 A1* 9/2024 Groene ................ G09F 9/3023

FOREIGN PATENT DOCUMENTS

DE 102016124863 A1 6/2018
DE 102018123407 A1 3/2020
DE 102021129672 A1 5/2023

* cited by examiner

*Primary Examiner* — Bao Q Truong
(74) *Attorney, Agent, or Firm* — Husch Blackwell LLP

(57) ABSTRACT

A lighting device is provided for a motor vehicle, and contains numerous light modules for generating a different lighting functions. A segmented liquid-crystal display is placed in front of the light modules in the direction in which light is emitted, and that can be backlit, in which each segment of the LCD has a dedicated light module or group of light modules.

9 Claims, 1 Drawing Sheet

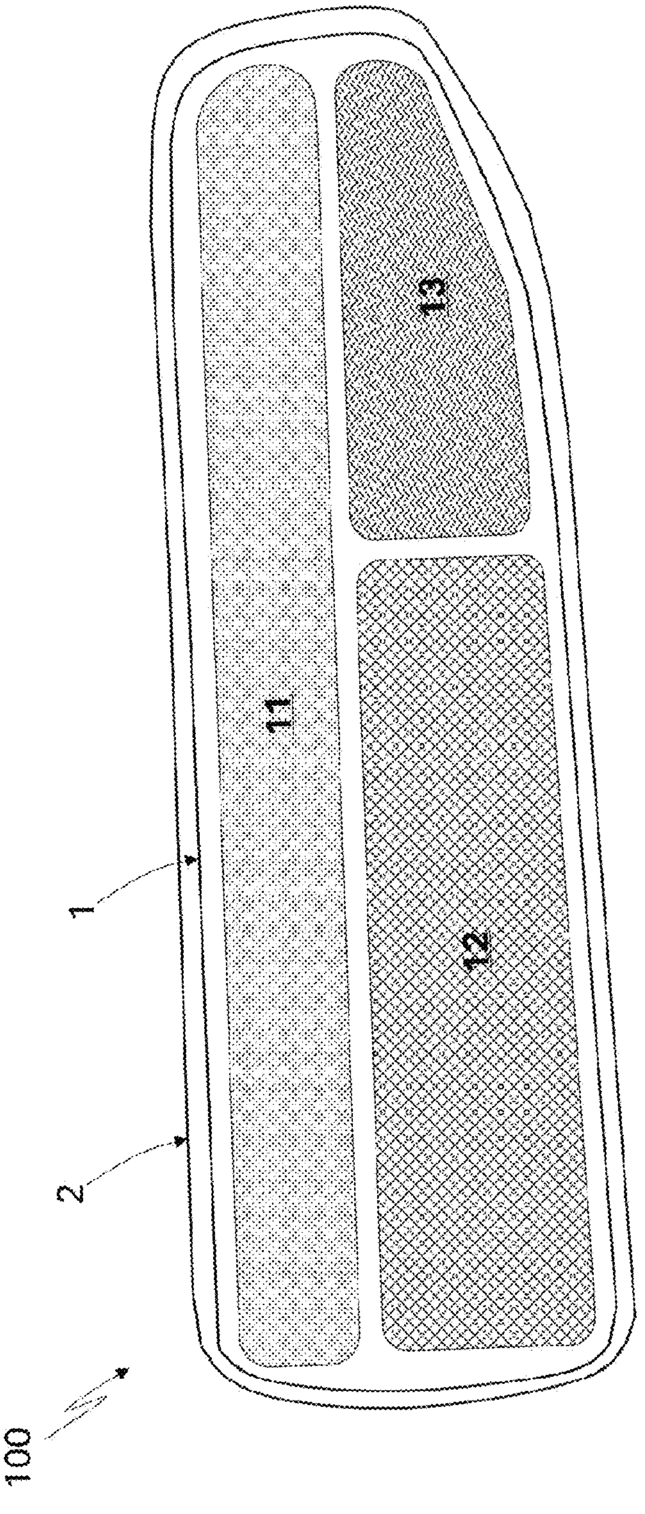
13
11
12
1
2
100

LIGHTING DEVICE FOR A MOTOR VEHICLE

CROSS REFERENCE

This application claims priority to European Application No. 10 2024 115323.7, filed Jun. 3, 2024, the entirety of which is hereby incorporated by reference.

FIELD OF THE INVENTION

The present invention relates to a lighting device for a motor vehicle, in particular a headlamp, that contains numerous light modules for generating different lighting functions.

BACKGROUND OF THE INVENTION

There are lighting devices for motor vehicles in the prior art with liquid-crystal displays (LCDs) that can be back lit, for digital control of the light distribution and brightness. By way of example, there are headlamps with LCD low and high beam lights, with which the roadway and other parts of the environment can be light dynamically and adaptively using various sensors, such that the light can be adapted to changing driving situations in real time. There are also daytime running lights and turn signals that use backlit LCDs. A separate LCD is used for each lighting function in the prior art, in which each LCD has different optical properties and pixel arrangements.

By way of example, DE 10 2021 129 672 A1 discloses a lighting device for a motor vehicle that contains a printed circuit board populated with numerous light-emitting diodes, a cover lens, and a segmented reflector element, which is placed between the printed circuit board and the cover lens, as well as an LCD on the cover lens in which the pixels can be switched on and off (transparent and opaque states).

BRIEF SUMMARY OF THE INVENTION

The object of the present invention is to propose an alternative embodiment of a lighting device with an LCD for a motor vehicle that contains numerous light modules for generating different lighting functions.

The technical teachings of the invention disclose that the lighting device has a segmented LCD placed in front of the light modules in the direction in which light is emitted, that can be backlit, in which each segment of the LCD has a dedicated light module or group of light modules.

The invention is based on the idea of creating an integrated LCD that has numerous light modules of different sizes and shapes for modulating the light, such that there does not have to be a separate LCD for each light module, as is the case in the prior art. This advantageously reduces the amount of materials that are needed and installation difficulties, and a particularly compact and aesthetically pleasing appearance can be obtained in which the interior of the lighting device is entirely concealed by a large LCD where the light is emitted.

In particular, the different segments of the LCD have different optical properties. The optical properties that are relevant for the present invention include the amount of light transmitted when the pixels in the segments in question are on or off, the reflectivity when off, and the color. The dynamics of the switching process can also be understood to be an optical property with the present application, in particular the time required to switch between on and off. The optical properties of each the segments of the LCD are determined by their lighting functions. By way of example, low beam and high beam lights should have segments with particularly high light transmitting levels.

By way of example, different segments of the LCD have different liquid crystals. This is one means of setting the optical properties of the individual segments. These liquid crystals can be nematic, chiral nematic or smectic phases. When using nematic phases, the liquid crystals can be parallel to the display surface (in-plane switching), or they can be perpendicular to the display surface when not in use. The first variation results in lower dependency on the perspective and a brighter color appearance, while the second offers a particularly high contrast between pixels that are on and off.

The segments in the LCD can also have different colored pigments. The liquid-crystal layer in selected segments of the LCD can be doped with black pigments, such that it looks black when opaque.

In an advantageous embodiment, the segments of the LCD have pixels of different sizes and/or shapes. These pixels are the smallest units of the segments that can be switched on and off individually, and therefore determine the resolution of the respective light signals that can be displayed. In addition to the sizes of the pixels, the shapes thereof can also vary in the different segments. By way of example, in addition to square pixels, there can also be polygonal pixels.

In another embodiment, the segments in the LCD may be controlled in different ways. By way of example, individual segments may be passive matrix displays in which the pixels are controlled passively using a matrix control, i.e. without additional electronic components for the individual pixels. More powerful segments may be active matrix displays in which each pixel has its own switch, which is useful for large segments with high resolution. In particular, each segment can be controlled independently of the other segments.

The lighting functions that can be generated with the light modules in the lighting device comprise high beams, low beams, daytime running lights, tail lights, marker lights, turn signals, and front or rear signal lights. By way of example, the high beams and low beams can be obtained with groups in the same segment of the LCD. Signal lights can be generated in segments of the LCD for displaying different images such as text, symbols, and graphics, as well as logos that are dynamically adjusted to the driving modes of the vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is an example lighting device.

DETAILED DESCRIPTION OF THE DRAWING

The invention shall be explained below in reference to the drawing of an exemplary embodiment. The drawing schematically shows a lighting device 100 obtained with the invention from the front, designed as a headlamp for a motor vehicle.

The lighting device shown in FIG. 1 contains numerous light modules for generating different lighting functions, and a segmented LCD 1 placed in front of the light modules in the direction in which light is emitted, that can be backlit, in which each segment 11, 12, 13 of the LCD 1 has a dedicated light module or group of light modules. The segments 11, 12, 13 are shown when they are all switched off, or opaque, such that the light modules behind them are not visible. The LCD 1 is directly behind the cover lens 2. There are light modules for high beams and low beams behind the first segment 11, a light module for daytime running lights behind the second segment 12, and a light module for turn signals behind the third segment 13. All of the segments 11, 12, 13 are designed for their lighting functions with regard to the optical properties, the liquid crystals that are used, including the pigments embedded therein, the sizes and shapes of the individual pixels, and the type of control.

List of Reference Symbols

| | |
|---|---|
| 100 | lighting device |
| 1 | liquid-crystal display |
| 11 | first segment of the LCD |
| 12 | second segment of the LCD |
| 13 | third segment of the LCD |
| 2 | cover lens |

The invention claimed is:

1. A lighting device for a motor vehicle, the lighting device comprising:

numerous light modules for generating different lighting functions;

a segmented liquid-crystal display ("LCD") placed in front of the light modules in a direction in which light is emitted from the numerous light modules, that is configured to be backlit, wherein each segment of the LCD has a dedicated light module or group of light modules, wherein liquid crystals of the LCD are in a nematic phase and switchable to be parallel to a surface of the LCD when in use and perpendicular to the surface of the LCD when not in use.

2. The lighting device according to claim 1, wherein the segments of the LCD each have different optical properties.

3. The lighting device according to claim 1, wherein the segments of the LCD each have different liquid crystals.

4. The lighting device according to claim 1, wherein the segments of the LCD each have different colored pigments.

5. The lighting device according to claim 1, wherein the segments of the LCD each have pixels of different sizes and/or shapes.

6. The lighting device according to claim 1, wherein the segments of the LCD are each controllable differently.

7. The lighting device according to claim 1, wherein the lighting functions that can be generated with the light modules comprise low beams, daytime running lights, tail lights, marker lights, turn signals, and front or rear signal lights.

8. The lighting device according to claim 1, further comprising an active matrix display wherein each pixel within the LCD has an individual switch.

9. The lighting device according to claim 1, further comprising a passive matrix display wherein pixels in each LCD segment are controlled using a matrix control.

* * * * *